Patented Apr. 15, 1924.

1,490,312

UNITED STATES PATENT OFFICE.

PERCY C. BOWNE, OF SANTA ANA, CALIFORNIA.

DRESSING FOR AUTOMOBILE TOPS AND THE LIKE AND METHOD OF MAKING THE SAME.

No Drawing.   Application filed April 18, 1922.   Serial No. 555,369.

*To all whom it may concern:*

Be it known that I, PERCY C. BOWNE, a citizen of the United States, residing at Santa Ana, in the county of Orange and State of California, have discovered and invented a new and useful Dressing for Automobile Tops and the like and Methods of Making the Same, of which the following is a specification.

This invention relates to compositions of matter adapted for use as a dressing which can be readily applied to automobile tops and the like, for the purpose of giving longer life, a brighter color, and a waterproofing to such tops.

An object of this invention is to provide a waterproof dressing for flexible automobile tops and the like, that is flexible and that will not crack under rough handling, or action of the weather.

Another object is to provide a dressing which will dry, dust proof, in a short space of time.

Other objects and advantages are cheapness, ease of handling and ease of application.

The method of producing this new composition of matter consists in first taking one-half gallon of crude rubber solution and cutting the same with gasolene until a product having the consistency of vulcanizing cement is produced, and mixing with such product raw linseed oil, drop black and japan drier in the manner and proportions substantially as follows, to wit:

Raw linseed oil, one-half gallon;
Drop black, one pound avoirdupois;
Japan drier, one-fourth pint.

The above ingredients thoroughly mixed as stated form a liquid which can be easily and quickly applied cold to an automobile top or the like, with a brush.

One or more coats may be applied according to the judgement of the user and the dressing will dry to dust proof condition in about six hours; that is to say after the application of a coat of the composition to an automobile top or the like, the coating becomes so hard that dust accumulations thereon may be readily brushed, wiped or washed away.

This new composition of matter affords a cover dressing for automobile tops and the like that is flexible and waterproof, and that resists atmospheric conditions, and that retains its luster in a superior degree.

It is understood that any equivalent of gasolene may be used to cut the crude rubber solution the purpose being to reduce the rubber to the required consistency; and that the material used whether gasolene or an equivalent thereof will evaporate when exposed to the air for a predetermined time.

I claim.

1. The method set forth of producing a flexible dressing for automobile tops and the like which consists in cutting crude rubber solution with gasolene to form a composition having the consistency of vulcanizing cement, and adding thereto and thoroughly mixing therewith, raw linseed oil, drop black, and japan drier, substantially as and for the purpose set forth.

2. A cover dressing for automobile tops and the like composed of the following ingredients, in the proportions substantially set forth, viz, one-half gallon crude rubber solution, cut with gasolene to the consistency of vulcanizing cement; one-half gallon raw linseed oil; one pound, avoirdupois, drop black; and one-fourth pint japan drier.

In testimony whereof, I have hereunto set my hand, at Santa Ana, California, this 11th day of April, 1922.

PERCY C. BOWNE.

Witness:
H. H. MOYE.